Sept. 23, 1924.
T. B. McLEROTH
1,509,440
MOLD FOR THE PRODUCTION OF AIR TUBES FOR PNEUMATIC TIRES
Original Filed May 5, 1922
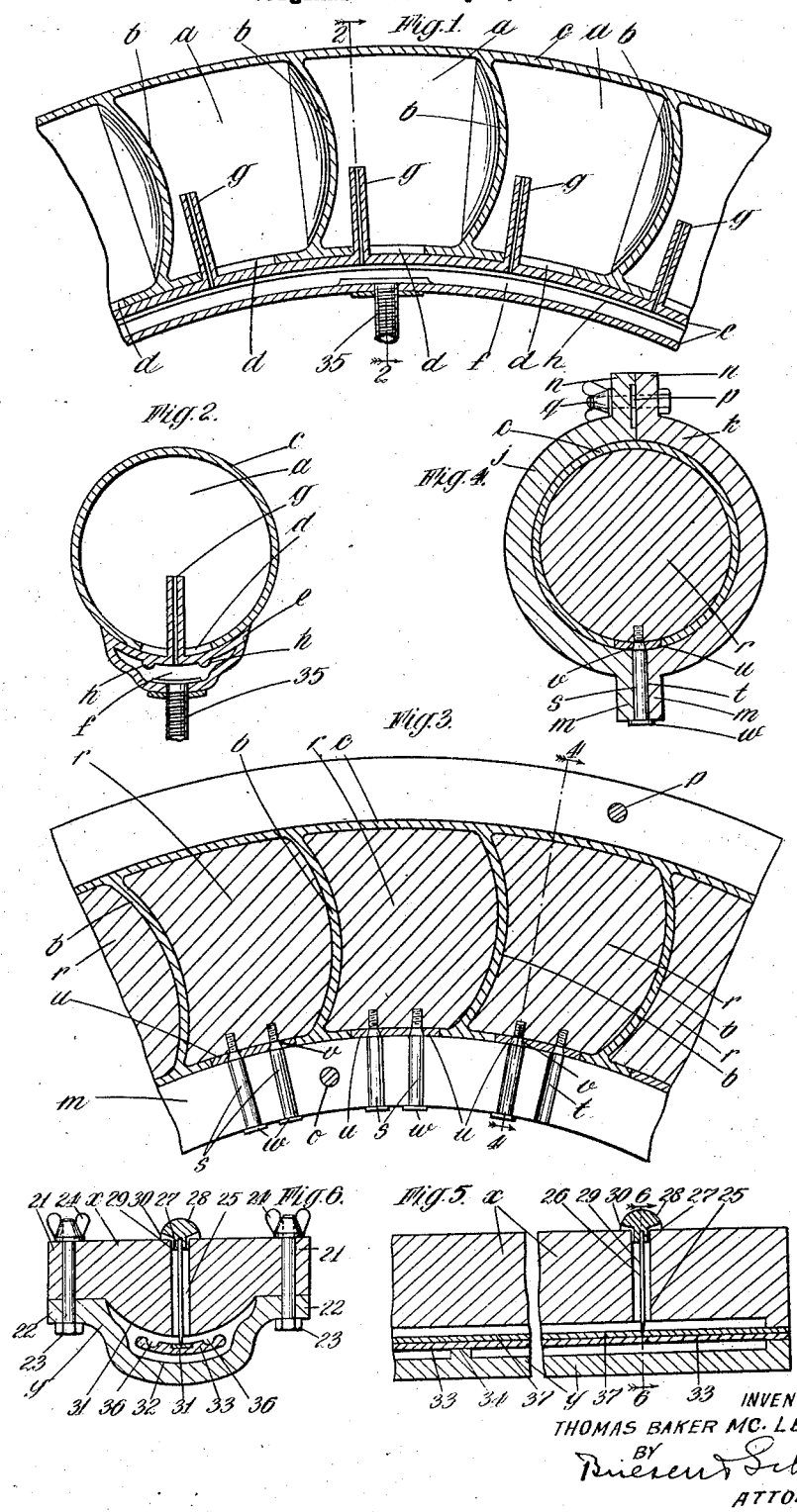
INVENTOR
THOMAS BAKER MC. LEROTH
BY
ATTORNEYS Patented Sept. 23, 1924.

1,509,440

UNITED STATES PATENT OFFICE.

THOMAS BAKER McLEROTH, OF LONDON, ENGLAND.

MOLD FOR THE PRODUCTION OF AIR TUBES FOR PNEUMATIC TIRES.

Original application filed May 5, 1922, Serial No. 558,635. Divided and this application filed March 7, 1923. Serial No. 623,392.

*To all whom it may concern:*

Be it known that I, THOMAS BAKER MC-LEROTH, of "Eastburn," The Crescent, Hadley Woods, London, England, a British subject, have invented certain new and useful Improvements in or Relating to Molds for the Production of Air Tubes for Pneumatic Tires, of which the following is a specification.

This invention relates to molds for the production of an air tube for a pneumatic tire, of the kind comprising a plurality of sections or compartments so arranged that the puncturing of one section or compartment will not materially affect the efficiency of the tire as a whole.

Air tubes of this kind and molds for the production thereof are described in the specifications accompanying prior United States Letters Patents Nos. 1,379,929 and 1,459,544 according to which an air tube for a pneumatic tire comprises a series of sections or compartments formed by partitions, and a passage called the feed passage running around the inner periphery of the tube, and communicating with each of said sections or compartments, by way of a valveless rubber feed tube projecting into such section or compartment and adapted, on a section or compartment being punctured, to be squeezed between the partitions and bent over by them and thereby to close the communication between such section or compartment and the feed passage. The tube was preferably made in a straight length and its ends joined subsequently, and it was stated that the feed passage could be formed integrally with the air tube or by a separate portion secured to said tube. The sections or compartments were produced by means of cores which were withdrawn through splits or apertures in the walls of the compartments and these splits or apertures were, according to said prior invention, closed by a band or a series of patches applied thereto after the ends of a length of the tube had been joined to constitute an annulus; and in the forms of the invention described the splits or apertures were arranged at what, in use, would be the tread surface of the tube.

The primary object of the present invention is to facilitate the manufacture of such air tubes and to this end a tubular strip or patch which constitutes the feed passage is employed to close splits or apertures arranged at what, in use, is to be the inner periphery of the tube.

According to said prior invention the communication between each of the sections or compartments and the feed passage was by way of a valveless rubber feed tube projecting into such compartment, and as described, such feed tubes were molded integral with the air tube one within each compartment. According to the present invention the several apertured projections may be molded or otherwise made integral with the tubular strip or patch and adapted to project into said compartments through splits or apertures in the air tube.

In accordance with this invention a mold for the production of an air tube comprises two annular sections divided on a substantially, central plane and adapted to be clamped together, a plurality of cores in said sections, and means carried by said sections or one of them and/or by said cores for producing in the tube splits or apertures through which the cores may be withdrawn. The sections are preferably divided on the central plane which corresponds with the central plane intersecting at right angles the axis of rotation of the wheel to which the tube is to be applied. The mold for the tubular strip or patch constituting the feed passage and adapted to serve as a closure for the core-withdrawing splits or apertures may comprise two sections adapted to be clamped together, and a core for the formation of the feed passage, one of said sections being adapted to produce on said strip or patch the required valveless feed tubes, whilst the other may produce an aperture for the inflating valve.

These sections may be straight so as to produce a length of strip or patch, the ends of which must be united when it is applied by solution or the like to the tube, or they may be annular, so as to produce a continuous strip or patch, and in the latter case the core for the feed passage must be a discontinuous annulus so as to be adapted to be withdrawn from the strip or patch.

The core may be positioned within the mold by pins carried by one of the sections and adapted to produce the bores of the feed tubes and it is preferable that said core should be furnished with a cushion or pad of lead or other soft metal into which the points of the pins may embed themselves when the parts are clamped together. After the tube proper and the tubular strip or patch have been molded and vulcanized the cores are withdrawn and said strip or patch is solutioned to the tube proper.

The invention is illustrated by the accompanying drawings wherein Figure 1 is a section, of one form of tube, on the central plane intersecting at right angles the axis of rotation of the wheel to which the tube is to be applied, Figure 2 is a cross-section substantially on the line 2—2, Figure 1, Figure 3 is a similar section to Figure 1 showing part of the mold for the production of the tube proper, Figure 4 is a cross-section on the line 4—4, Figure 3, Figure 5 is a similar view to Figure 3 showing parts of the molds for the production of the tubular strip or patch, and Figure 6 is a cross-section on the line 6—6, Figure 5.

In accordance with the form of the invention illustrated by Figures 1 to 4 the air tube consists of a plurality of compartments $a \ldots$ formed by concavo-convex partitions $b$ in a tube $c$ which has, at that part which corresponds with the inner periphery of the tire, apertures $d \ldots$ opening into the several compartments $a \ldots$ The strip or patch $e$ by which such apertures $d \ldots$ are closed is made tubular and constitutes the feed passage $f$ and has one face concave in transverse cross-section as shown in Figure 2 to conform with the transverse curvature of the tube $c$, further it is preferably formed with tapered or feathered marginal portions. Projecting from and at intervals along the length of said concave face is a series of valveless rubber feed tubes $g \ldots$ adapted, when the strip or patch $e$ is applied to the tube $c$, to project through the aperture $d$, one into each compartment $a$. The patch $e$ has on that face of its bore nearer the rubber feed tubes $g \ldots$ a pair of parallel ribs $h, h$ spaced one on either side of the plane in which lie said feed tubes $g \ldots$ and serving to prevent the adjacent ends of the apertures from being sealed by contact between the opposite faces of the feed passage $f$, and if desired these ribs $h, h$ may be notched or interrupted or may be replaced by two series of hemispherical or other protuberances (not shown).

The strip or patch $e$ is applied to the tube $c$ so as to close the apertures $d \ldots$, preferably so that the feed tube $g$ in each compartment $a$ lies close against the edge of the aperture $d$ of such compartment $a$ and nearer that partition $b$ the convex face of which is presented to said compartment $a$ and is secured by indiarubber solution or other known means.

Such a tube functions in the same manner as the tube described and claimed in the prior Letters Patent aforesaid, and may be more readily produced.

One form of mold in which the tube portion $c$ may be produced comprises two annular sections $j, k$ divided, as shown in Figure 4, on a central plane which corresponds with the central plane intersecting at right angles the axis of revolution of a wheel to which such a tube is to be applied, each of said sections $j, k$ being of semi-circular cross-section and flanged as at $m, n$ at its edges and provided with bolts $o, p$ and butterfly nuts $q$ or the like, in order that said sections may be clamped together. Within the annulus enclosed by said sections is arranged a series of cores $r \ldots$ each of which is curved longitudinally to conform with the curvature of the sections $a$, has one end convex and the other end concave and has such dimensions and wedge shape that the tube $c$ and partitions $b \ldots$ respectively have uniform thickness. Each core $r$ may be held in position within the mold $j, k$ by a pair of pins $s\ s$ screwed thereinto and extending radially therefrom so that they may be received in grooves $t$ in the mating faces of the inner flanges $m, m$ of the mold sections $j, k$ and these pins preferably pass through and are adapted to clamp against the core a curved plate $u$ corresponding in thickness with the tube $c$ to be produced and adapted to form in the wall of the corresponding compartment $a$ an aperture $d$ through which the core $r$ may be withdrawn. For this purpose the pins $s \ldots$ are provided with tapered or like shoulders $v \ldots$ engaging the plate $u$ and with heads $w$ engaging the outer edges of the flanges $m, m$ so as rigidly to position the plate $u$ and core $r$.

The form of mold shown in Figures 5 and 6 is adapted to produce a tubular strip or patch $e$ of substantially uniform cross-section and comprises two straight sections $x$ and $y$ flanged at their edges as at 21, 22 and furnished with bolts 23 and butterfly nuts 24 in order that they may be clamped together. The section $x$ is formed along its longitudinal centre line with a series of passages 25 therethrough of a diameter corresponding with the external diameter of the feed tubes $g$ to be produced, and in each of said passages 25 is fitted a pin 26 of a diameter corresponding with the internal diameter of said tubes $g$, each of said pins 26 having a shoulder 27 adapted to fit in a passage 25 so as to centralize the pin 26 and a head 28 to position it longitudinally and if desired the shoulders 27 and heads 28 of the pins may be grooved as at 29, 30 to permit the rubber to spew over. The inner face of the section $x$ is curved transversely as at 31 to conform with the transverse section of the tube $c$ whilst the inner face of the section $y$ is curved transversely to a smaller radius and may be formed with a longitudinal groove 32 along the centre of its width. Midway between the inner faces of the sections $x$ and $y$ a core 33 is disposed and is supported at its ends in the ends of the mold sections $x$, $y$ and at about the centre of its length by a boss 34 on the mold section $y$ as shown in Figure 5 said boss 34 being adapted to produce an aperture for the usual inflating valve 35. The core 33 may be flat or concavo-convex in cross-section and is formed with two longitudinal grooves 36, 36 for the production of the parallel ribs $h$, $h$, aforesaid and along the centre of its length a lead cushion or pad 37 is secured in a dovetailed or undercut groove. When the pins 26 are inserted in the passages 25 in the section $x$ their points embed themselves in this pad 37 and not only assist in positioning the core 33 but also ensure clear openings at the mouths of the feed tubes $g$.

The two sections $x$ and $y$ of this mold and the core 33 may be annular so as to produce a continuous patch $e$ the concave section $y$ of the mold and the other section $x$ also if desired being made in two parts clamped together.

The core 33 must, in this case, be a discontinuous annulus so that it may be withdrawn through a slit in the patch $e$ by a circular twisting movement. This slit should preferably be so arranged relatively to the feed tubes $g$ . . . that when the annular patch $e$ is applied to the tube $c$ it will lie opposite a portion of the wall of the tube $c$ between two adjacent core-withdrawing apertures $d$, $d$ so that it may be sealed as and when the patch $e$ is solutioned to the tube $c$. If desired, however, it would also be possible to withdraw the discontinuous core through the aperture formed for the inflating valve 35, whilst the two sections $x$, $y$ of the mold may be divided only on the central plane in which lie the axes of the feed tubes $g$ . . .

The present application is a division of another application filed by me in the United States Patent Office on May 5, 1922, Serial No. 558,635.

I claim:—

1. For the production of the tube proper of an air tube for a pneumatic tire, comprising a series of compartments into which open apertures in said tube proper, a tubular patch closing said apertures and valveless rubber feed tubes mounted on said tubular patch and projecting through said apertures one into each compartment, a mold comprising two annular sections divided on a substantially central plane and adapted to be clamped together, a plurality of cores in said sections, and aperture-producing means carried by said sections for producing at the inner periphery of the tube apertures through which the cores may be withdrawn.

2. For the production of the tube proper of an air tube for a pneumatic tire, comprising a series of compartments into which open apertures in said tube proper, a tubular patch closing said apertures and valveless rubber feed tubes mounted on said tubular patch and projecting through said apertures one into each compartment, a mold comprising two annular sections divided on a substantially central plane and adapted to be clamped together, a plurality of cores in said sections, and aperture-producing means carried by one of said sections for producing at the inner periphery of the tube apertures through which the cores may be withdrawn.

3. For the production of the tube proper of an air tube for a pneumatic tire, comprising a series of compartments into which open apertures in said tube proper, a tubular patch closing said apertures and valveless rubber feed tubes mounted on said tubular patch and projecting through said apertures one into each compartment, a mold comprising two annular sections divided on a substantially central plane and adapted to be clamped together, a plurality of cores in said sections, and aperture-producing means carried by said cores for producing at the inner periphery of the tube apertures through which the cores may be withdrawn.

4. For the production of the tube proper of an air tube for a pneumatic tire, comprising a series of compartments into which open apertures in said tube proper, a tubular patch closing said apertures and valveless rubber feed tubes mounted on said tubular patch and projecting through said apertures one into each compartment, a mold comprising two annular sections divided on a substantially central plane and adapted to be clamped together, a plurality of cores in said sections, and aperture-producing means carried by said sections and by said cores for producing at the inner periphery of the tube apertures through which the cores may be withdrawn.

5. For the production of the tube proper of an air tube for a pneumatic tire, comprising a series of compartments into which open apertures in said tube proper, a tubular patch closing said apertures and valveless rubber feed tubes mounted on said tubular patch and projecting through said apertures one into each compartment, a mold comprising two annular sections divided on a substantially central plane and adapted to be clamped together, a plurality of cores in said sections, and aperture-producing means carried by one of said sections and by said cores for producing at the inner periphery of the tube apertures through which the cores may be withdrawn.

6. For the production of the tubular patch, employed for closing apertures in an air tube for a pneumatic tire, comprising a series of compartments into which open apertures in said tube proper, a tubular patch closing said apertures and valveless rubber feed tubes mounted on said tubular patch and projecting through said apertures one into each compartment, a mold comprising two sections adapted to be clamped together, and a core adapted to form a feed passage in said patch, one of said sections being adapted to produce on said patch valveless feed tubes whilst the other may produce an aperture for an inflating valve.

7. A mold as claimed in claim 6 in which the core is positioned by pins carried by one of the sections and adapted to produce the bores of the valveless feed tubes, substantially as set forth.

THOMAS BAKER McLEROTH.